US012770875B2

(12) United States Patent
Park et al.

(10) Patent No.: US 12,770,875 B2
(45) Date of Patent: *Oct. 20, 2026

(54) ANODE FOR SECONDARY BATTERY, METHOD FOR PREPARING THE SAME, AND SECONDARY BATTERY COMPRISING ANODE

(71) Applicant: SK On Co., Ltd., Seoul (KR)

(72) Inventors: Sung Jun Park, Daejeon (KR); Byoung Wook Jo, Daejeon (KR); In Ha Kim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 825 days.

This patent is subject to a terminal disclaimer.

(21) Appl. No.: 17/721,121

(22) Filed: Apr. 14, 2022

(65) Prior Publication Data

US 2023/0231131 A1 Jul. 20, 2023

(30) Foreign Application Priority Data

Jan. 18, 2022 (KR) ........................ 10-2022-0006943

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0404* (2013.01); *H01M 4/1391* (2013.01);
(Continued)

(58) Field of Classification Search
CPC ......... H01M 2004/021; H01M 4/1395; H01M 4/1393; H01M 2004/027; H01M 4/583;
(Continued)

(56) References Cited

U.S. PATENT DOCUMENTS 3,980,495 A * 9/1976 Roche ...................... H01M 4/38 429/207
5,888,670 A * 3/1999 Kawakami ............ H01M 4/587 429/231.95
(Continued)

FOREIGN PATENT DOCUMENTS

EP 2987192 B1 1/2019
EP 3550639 A1 * 10/2019 ........ H01M 10/0525
(Continued)

OTHER PUBLICATIONS

Machine translated KR20030052950A (Year: 2003).*
(Continued)

*Primary Examiner* — Jennifer Dieterle
(74) *Attorney, Agent, or Firm* — The Webb Law Firm

(57) ABSTRACT

In an anode for a secondary battery, a method for preparing the anode, a secondary battery including the anode, and an apparatus for applying a magnetic field, the anode for a secondary battery includes an anode mixture layer on at least one surface of an anode current collector, in which a z-tensor value of a pore in the anode mixture layer is 0.25 or more. The method includes applying an anode mixture slurry including an anode active material to at least one surface of an anode current collector; and drying the anode mixture slurry to form an anode mixture layer. During at least one of the applying and the drying, a magnetic field in which a direction of a line of magnetic force and magnetic force strength change is applied from both upper and lower surfaces of the anode current collector to orient the anode active material and the pore.

14 Claims, 4 Drawing Sheets

(51) Int. Cl.

| | |
|---|---|
| ***H01M 4/1391*** | (2010.01) |
| ***H01M 4/1393*** | (2010.01) |
| ***H01M 4/1395*** | (2010.01) |
| ***H01M 4/38*** | (2006.01) |
| ***H01M 10/0525*** | (2010.01) |
| *H01M 4/02* | (2006.01) |

(52) U.S. Cl.
CPC ....... *H01M 4/1393* (2013.01); *H01M 4/1395* (2013.01); *H01M 4/386* (2013.01); *H01M 4/387* (2013.01); *H01M 10/0525* (2013.01); *H01M 2004/021* (2013.01)

(58) Field of Classification Search
CPC .. H01M 4/0404; H01M 4/1391; H01M 4/386; H01M 4/387; H01M 10/0525; H01M 4/587; H01M 4/0402; H01M 4/133; H01M 10/052; H01M 4/625; H01M 4/366; H01M 4/0471; H01M 4/13; H01M 4/131; H01M 4/139; H01M 4/62; Y02E 60/10
See application file for complete search history.

(56) References Cited

U.S. PATENT DOCUMENTS

| | | | | |
|---|---|---|---|---|
| 10,374,214 | B2 * | 8/2019 | Wood .................. | H01G 9/0029 |
| 11,189,824 | B2 | 11/2021 | Ebner et al. | |
| 2002/0160197 | A1 | 10/2002 | Klug et al. | |
| 2012/0164530 | A1 | 6/2012 | Temmyo et al. | |
| 2013/0255074 | A1 * | 10/2013 | Uchida ............... | H01M 4/0404 29/623.5 |
| 2014/0065478 | A1 | 3/2014 | Mitsuhashi et al. | |
| 2014/0072848 | A1 | 3/2014 | Hagiwara | |
| 2017/0018763 | A1 * | 1/2017 | Matsubara .......... | H01M 10/052 |
| 2018/0151867 | A1 | 5/2018 | Lim et al. | |
| 2019/0190010 | A1 | 6/2019 | Ebner et al. | |
| 2019/0355972 | A1 * | 11/2019 | Lee ...................... | H01M 10/04 |
| 2020/0388832 | A1 | 12/2020 | Kwon et al. | |
| 2022/0140343 | A1 | 5/2022 | Park et al. | |
| 2023/0231131 | A1 | 7/2023 | Park et al. | |

FOREIGN PATENT DOCUMENTS

| | | | | |
|---|---|---|---|---|
| EP | 3613779 | B1 | | 11/2021 |
| EP | 3993088 | A1 | | 5/2022 |
| EP | 4213229 | A1 | | 7/2023 |
| EP | 3848682 | B1 | | 6/2025 |
| EP | 4423822 | B1 | | 6/2025 |
| JP | H08321306 | A | | 12/1996 |
| JP | H10321219 | A | | 12/1998 |
| JP | 20030052949 | A | | 6/2003 |
| JP | 2010219069 | A | | 9/2010 |
| JP | 2012129079 | A | | 7/2012 |
| JP | 2019185943 | A | | 10/2019 |
| KR | 20030052949 | A | | 6/2003 |
| KR | 20030052950 | A | * | 8/2004 |
| KR | 1020080107997 | A | | 12/2008 |
| KR | 1020130118989 | A | | 10/2013 |
| KR | 1020150143790 | A | | 12/2015 |
| KR | 1020180062390 | A | | 6/2018 |
| KR | 1020180113404 | A | | 10/2018 |
| KR | 1020190049803 | A | | 5/2019 |
| KR | 101972235 | | | 8/2019 |
| KR | 1020210130062 | A | | 10/2021 |
| WO | 2014064499 | A1 | | 5/2014 |
| WO | 2016054530 | A1 | | 4/2016 |

OTHER PUBLICATIONS

"Instruction Manual E: Chroma Meter CR-300/410", Konica Minolta, 2002, pp. 1-160.
"Chroma Meter CR-400/410 Instruction Manual", Konica Minolta, 2002-2013, pp. 1-156.
"Zeiss Xradia 520 Versa, Submicron X-ray Imaging: Extending the Limits of Your Exploration", Carl Zeiss Microscopy GmbH, 2017, pp. 1-24.
Zhang et al., "Magnetic Field regulating the Graphite Electrode for Excellent Lithium-Ion Batteries Performance", ACS Sustainable Chemistry & Engineering, 2019, pp. 6152-6160, vol. 7.
"Silicon and Graphite: A Materials Match Made in Battery Heaven", Sandia National Laboratories, 2003, accessed at <https://newsreleases.sandia.gov/silicon-and-graphite-a-materials-match-made-in-battery-heaven/>.

* cited by examiner $$a_{ij}=\begin{bmatrix} 1/3 & 0 & 0 \\ 0 & 1/3 & 0 \\ 0 & 0 & 1/3 \end{bmatrix}$$

3-D random $$a_{ij}=\begin{bmatrix} 1/2 & 0 & 0 \\ 0 & 1/2 & 0 \\ 0 & 0 & 0 \end{bmatrix}$$

planar random $$a_{ij}=\begin{bmatrix} 1 & 0 & 0 \\ 0 & 0 & 0 \\ 0 & 0 & 0 \end{bmatrix}$$

aligned

ANODE FOR SECONDARY BATTERY, METHOD FOR PREPARING THE SAME, AND SECONDARY BATTERY COMPRISING ANODE

CROSS-REFERENCE TO RELATED APPLICATION

This application claims priority to Korean Patent Application No. 10-2022-0006943 filed Jan. 18, 2022, the disclosure of which is hereby incorporated by reference in its entirety.

BACKGROUND OF THE INVENTION

Field of the Invention

The present disclosure relates to an anode for a secondary battery, a method for preparing the same, and a secondary battery comprising the anode.

Description of Related Art

In general, an anode for a secondary battery is prepared by a process of applying an anode mixture, prepared including anode active materials, conductive agents, binders, and solvents, to an anode current collector, drying the anode mixture, and rolling the anode mixture.

In such an electrode preparing process, anode active materials having an anisotropic structure are mainly oriented in a horizontal direction, parallel to the anode current collector, and pores formed between the anode active materials are also mainly oriented in the horizontal direction. As the anode active materials and the pores are oriented in the horizontal direction as described above, lithium ions move through the pores formed in the horizontal direction between the anode active materials while the secondary battery is charged or discharged.

Meanwhile, with the recent increase in demand for secondary batteries, demand for high performance and long-term use of secondary batteries is increasing. To this end, there is a trend of increasing the capacity of secondary batteries by increasing the loading amount of electrodes.

However, when the pores in the anode are oriented in the horizontal direction as described above, a movement distance of lithium ions is greatly increased with the increase in the loading amount of electrodes. The increase in the movement distance causes an increase in resistance during charging, resulting in an increase in discharge time.

In particular, when a secondary battery is charged or discharged at a high C-rate, lithium salt (Li-plating) is precipitated on a surface of an electrode surface, and thus, as the charge and discharge cycle is repeated, the capacity of the battery may decrease and the safety of the battery may be impaired.

In order to solve these problems, Korean Patent Publication No. 2003-0052949 (which is incorporated herein by reference) discloses a method of preparing an anode by applying an anode paste including an anode active material to a substrate and applying a magnetic field to the substrate to orient graphite powder particles and drying and rolling the graphite powder particles.

SUMMARY OF THE INVENTION

The present disclosure provides an anode in which a movement path of lithium ions is improved by improving orientation of pores in an anode mixture layer with respect to an electrode current collector.

The present disclosure provides a method for preparing an anode with improved orientation of pores in an anode mixture layer with respect to an anode current collector.

According to the exemplary embodiment in the present disclosure, an anode for a secondary battery includes: an anode mixture layer provided on at least one surface of an anode current collector, in which a z-tensor value of a pore in the anode mixture layer is 0.25 or more.

The anode mixture layer may have an electrode density of 1.50 g/cc or more.

The anode mixture layer may include a carbon-based anode active material.

The anode mixture layer may include artificial graphite, natural graphite, or a mixture thereof as the anode active material.

The anode mixture layer may further include at least one anode active material selected from the group consisting of a silicon (Si)-based anode active material, a tin (Sn)-based anode active material, and a lithium vanadium oxide anode active material.

The anode active material may be an amorphous material, a plate-like material, a flake-like material, a spherical material, a fibrous material, or a mixture of at least two thereof.

The anode mixture layer may include 94 to 98 wt % of an anode active material, 0.1 to 3 wt % of a conductive agent, and 1.5 to 3 wt % of a binder based on a total weight of the anode mixture layer.

According to the exemplary embodiment in the present disclosure, a method for preparing an anode includes: step (A) forming an anode mixture layer by coating an anode mixture including the anode active material on at least one surface of an anode current collector; and step (B) applying a magnetic field to the anode mixture layer to change an orientation of a pore between the anode active materials, in which a z-tensor value of a pore in the anode mixture layer is 0.25 or more.

In step (B), a change in a direction of a line of magnetic force of the magneitc field and magnetic force strength of the magneitc field may be applied from both upper and lower surfaces of the anode current collector.

The method for preparing an anode further includes step (C) drying the negative electrode mixture layer, and step (B) may be performed after step (A), before step (C), or simultaneously with step (C).

In the magnetic field, lines of magnetic force may be perpendicular to the upper and lower surfaces of the anode current collector.

The magnetic field may have a first line of magnetic force in a direction from the upper surface toward the lower surface of the anode current collector and a second line of magnetic force in a direction from the lower surface toward the upper surface of the anode current collector that are periodically alternately formed.

The magnetic field may have a first line of magnetic force in a direction from the lower surface toward the upper surface of the anode current collector and the second line of magnetic force in a direction from the upper surface toward the lower surface of the anode current collector that are periodically alternately formed.

The magnetic force strength of the first line of magnetic force may increase and then decrease to change to the second line of magnetic force, and a line of magnetic force of the second line of magnetic force may increase and then decrease.

The line of magnetic force may have a sine wave in magnetic force strength and in a direction of a line of magnetic force.

The direction of the line of magnetic force may change at a cycle of 100 mm to 1000 mm of relative movement between the anode current collector and the magnetic field during application of the magnetic field.

The magnetic field may have a maximum magnetic force strength of 4000 Gauss (G) or more.

The magnetic field may be applied for 1 second or more.

An anode mixture slurry may have a viscosity of 150,000 centipoise (cp) or less when measured at 25° C. and a shear rate of 0.1 $s^{-1}$.

According to the exemplary embodiment in the present disclosure, a secondary battery includes: an electrode assembly in which the anodes described above and cathodes including a cathode mixture layer on at least one surface of a cathode current collector are alternately stacked with separator as a boundary; and a battery case in which the electrode assembly is accommodated and sealed.

BRIEF DESCRIPTION OF DRAWINGS

The above and other aspects, features, and advantages of the present inventive concept will be more clearly understood from the following detailed description, taken in conjunction with the accompanying drawings, in which:

FIGS. 3A to 3C are diagrams schematically illustrating a concept of an orientation tensor that evaluates an orientation of pores in the anode mixture layer in the 3-D structure, in which FIG. 3A illustrates a case (3-D random) in which the pores are randomly oriented in all axial directions of X1, X2 and X3, FIG. 3B illustrates a case (planar random) in which the pores are oriented in a plane formed by any two axes of X1 and X2, and FIG. 3C illustrates a case in which the pores are aligned in an X1-axis direction;

DESCRIPTION OF THE INVENTION

Figure 1:
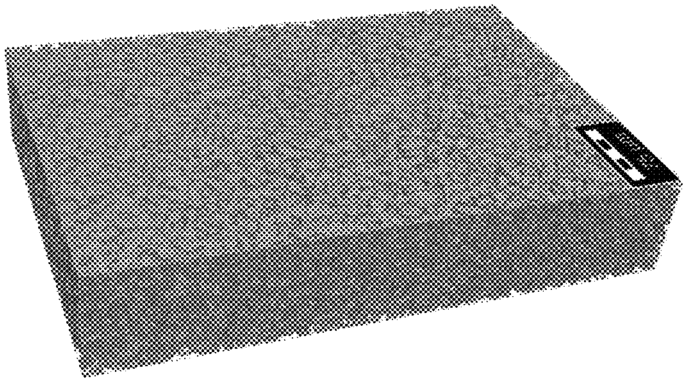
FIG. 1 is a three-dimensional (3-D) image of an anode mixture layer obtained using an X-ray microscope for the anode mixture layer.

Various advantages and features of the present disclosure and methods accomplishing them will become apparent from the following description of embodiments with reference to the accompanying drawings. However, the present disclosure is not limited to the embodiments disclosed herein, but will be implemented in various forms. The embodiments make contents of the present disclosure thorough and are provided so that those skilled in the art can easily understand the scope of the present disclosure. Therefore, the present disclosure will be defined by the scope of the appended claims. Detailed contents for implementing the present disclosure will be described in detail with reference to the accompanying drawings below. Irrespective of the drawings, like reference numbers refer to like elements, and "and/or" includes each and one or more combinations of the recited items.

Unless defined otherwise, all terms (including technical and scientific terms) used in the present specification have the same meaning as meanings commonly understood by those skilled in the art to which the present disclosure pertains. Throughout the present specification, unless described to the contrary, "including" any component will be understood to imply the inclusion of other elements rather than the exclusion of other elements. In addition, a singular form includes a plural form unless specially described in the text.

When an element such as a layer, a film, a region, and a plate is "on" or "over" another component in the specification, it can be directly on the other element or intervening elements may be present therebetween.

The present disclosure provides an anode in which pores (voids) between anode active materials are oriented in a vertical direction by orienting the anode active materials in a vertical direction with respect to an anode current collector, a method for preparing the anode, and an arrangement structure of a magnetic field applying apparatus used to prepare the anode.

In general, an anode for a secondary battery is prepared by a process of applying anode mixture slurry, which is prepared including an anode active material, a conductive agent, a binder, and a solvent, to an anode current collector, drying the anode mixture slurry, and rolling the anode mixture slurry. In this process, the anode active materials having an anisotropic structure are mainly oriented in a direction (horizontal direction) parallel to the anode current collector, and lithium ions move to an inside of the anode through pores formed in a horizontal direction between these anode active materials while the secondary battery is charged and discharged.

However, when the lithium ions move through the pores formed in the horizontal direction, as the loading of the electrode increases, a movement distance to the inside of the electrode increases significantly, resulting in an increase in resistance during the charging. In particular, when the charging is performed at a high C-rate, lithium salt (Li-plating) is formed on a surface of the electrode, whereupon, as charge and discharge cycles are repeated, the capacity of the battery may decrease.

Since the lithium ions move through the pores in the anode mixture layer, orienting the pores in the anode mixture layer in a vertical direction with respect to the anode current collector may be more effective in shortening the movement path of the lithium ions.

Therefore, the present disclosure provides an anode in which the pores are developed in the anode mixture layer to shorten the movement path of the lithium ions, and the pores in the anode mixture layer are oriented in the vertical direction with respect to the anode current collector.

As the pores in the anode mixture layer are oriented in the direction (vertical direction) perpendicular to the anode current collector, a length of a path through which the lithium ions move to the inside becomes shorter, which may lower the resistance of the battery.

As an exemplary embodiment, after the pores in the anode mixture layer formed by applying a magnetic field are three-dimensionally imaged using an X-ray microscope, an anode having a Z-tensor of a specific value obtained by evaluating an orientation tensor in each axial direction is provided. That is, it is possible to provide a secondary battery with improved charge and discharge efficiency and quick charging performance at a high C-rate by developing the pores with an improved orientation of the pores with the movement path of the lithium ions to the anode mixture layer.

Orienting the pores in the perpendicular direction with respect to upper and lower surfaces of the current collector does not mean that all the pores need to be oriented perpendicularly but means that the pores oriented in the perpendicular direction predominately exist, and the orientation of the pores oriented in the perpendicular direction with respect to the upper and lower surfaces of the current collector may be represented as the Z-tensor.

The anode is an anode for a lithium ion secondary battery including an anode mixture layer on at least one surface of an anode current collector, and the pore in the anode mixture layer may have a Z-tensor value of 0.25 or more.

For the measurement of the Z-tensor value, an X-ray microscope may be used for the anode to image the pores in the electrode, and the Z-tensor value may be derived from the obtained image of the pores.

Figure 2:
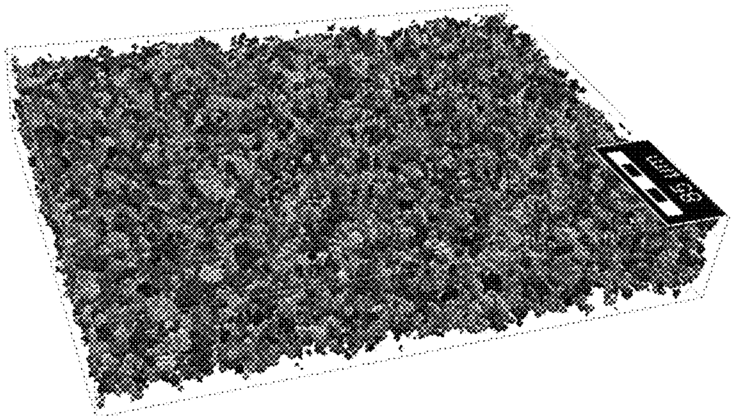
FIG. 2 is a 3-D image of an internal pore structure of the anode mixture layer of FIG. 1 obtained by converting a 3-D image of the anode mixture layer obtained in FIG. 1.

More specifically, when the X-ray microscope is used for the inside of the anode mixture layer, as illustrated in FIG. 1, a three-dimensional (3-D) image of the pores in the anode mixture layer may be obtained. Furthermore, it is possible to perform 3-D rendering on the obtained image to convert the obtained image into a 3-D image of the pore structure inside the anode mixture layer as illustrated in FIG. 2. As an apparatus capable of obtaining such a 3-D image, a facility including an X-ray source, detectors, and a lens capable of magnifying a source between the detectors may be used. An example of the apparatus may include the Xraida 520 Versa from Zeiss Co. In addition, an example of software for the 3-D rendering may include GEODICT.

From the obtained 3-D image of the pores in the anode mixture layer, the orientation of the pores in each axial direction may be represented by an orientation tensor. That is, the 3-D image for each pore may be evaluated in three axes of X, Y, and Z, and the sum of tensors on the three axes in one object becomes "1," while the concept thereof is schematically illustrated in FIGS. 3A to 3C.

Figures 3A, 3B, 3C:
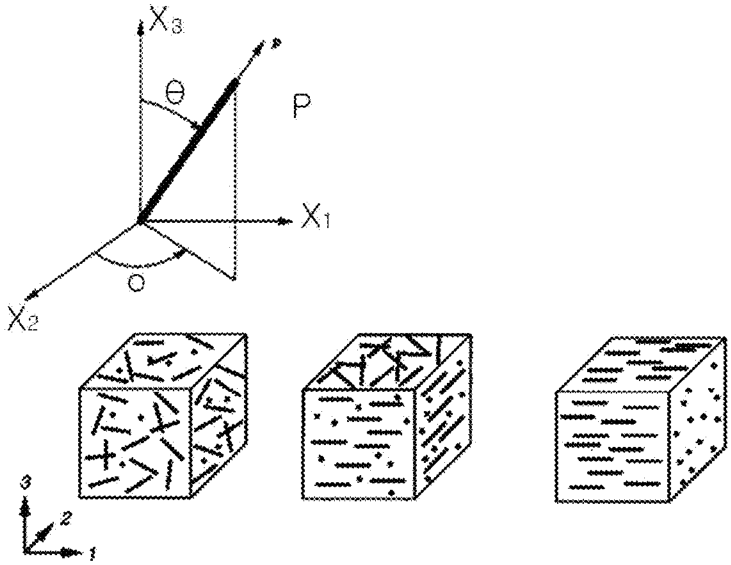

FIGS. 3A to 3C illustrate the orientation with respect to any one object by an orientation tensor, in which FIG. 3A illustrates a case (3-D random) where the pores are randomly oriented in all axial directions of X1, X2 and X3, that is, three-dimensionally; FIG. 3B illustrates a case (planar random) where the pores are randomly oriented in a plane formed by any two axes of X1 and X2, that is, one plane; and FIG. 3C illustrates a case in which the pores are aligned and oriented in an X1-axis direction.

As a magnitude of a value of an orientation tensor (Z-tensor) of a specific axis increases, the pores are oriented in the corresponding axis. That is, as the Z-tensor value increases, it may be evaluated that the orientation is developed in the Z axis (corresponding to an X3 axis in FIG. 3).

Referring to FIGS. 3A to 3C, for example, when the X, Y, and Z-tensor values in the anode mixture layer are 0.33, respectively, FIG. 3A illustrates the random orientation of the pores, and when the Z-tensor value is 0.33 or more, indicates that the pores in the anode mixture layer tend to be predominantly oriented in the Z axis, that is, in the perpendicular direction with respect to the anode current collector. That is, when the Z-tensor value is 0.33 or more, it may mean that the pores oriented in the Z-axis direction are predominantly formed in the anode mixture layer.

When the orientation of the pores is developed in the Z axis, the shape of the pore is developed to the corresponding axis, and thus the length of the pore to the corresponding axis in an object may be increased. According to an exemplary embodiment in the present disclosure, the Z-tensor value of the pores in the anode mixture layer preferably has a value of 0.25 or more. When the Z-tensor value of the pore is 0.25 or more, the orientation of the pores in the anode mixture layer in the perpendicular direction with respect to the anode current collector increases, thereby shortening the movement path of lithium ions.

Therefore, lithium ions may be easily inserted and desorbed during the charging and discharging, and thus, the charge and discharge efficiency at the high C-rate may be improved, thereby improving quick charging performance. In addition, the diffusion resistance of the lithium ions into the electrode during the charging and discharging may be reduced, thereby suppressing the lithium salt (Li-plating) from being formed on the surface of the electrode.

It is possible to improve the orientation of the pores in the anode mixture layer by applying a magnetic field by a magnet. The improvement in the orientation of the pores in the anode mixture layer by applying the magnetic field may be affected by a viscosity of anode mixture slurry containing the anode active material, a temperature of the anode mixture slurry, the applied magnetic force strength, and the like. Among them, the magnetic force strength may have the greatest effect on the orientation.

In general, the anode mixture slurry is applied and dried while the anode current collector is traveled, translated, or moved in a certain direction, e.g., a traveling direction, or the anode current collector applied with the anode mixture slurry is traveled, translated, or moved, e.g., in the traveling direction, and dried. The related art uses a magnet capable of applying a magnetic field, which form magnetic forces having the same strength and a magnetic field forming a line of magnetic force in the same direction, in a width direction with respect to the traveling direction of the anode current collector, thereby applying the magnetic field.

Figure 4:
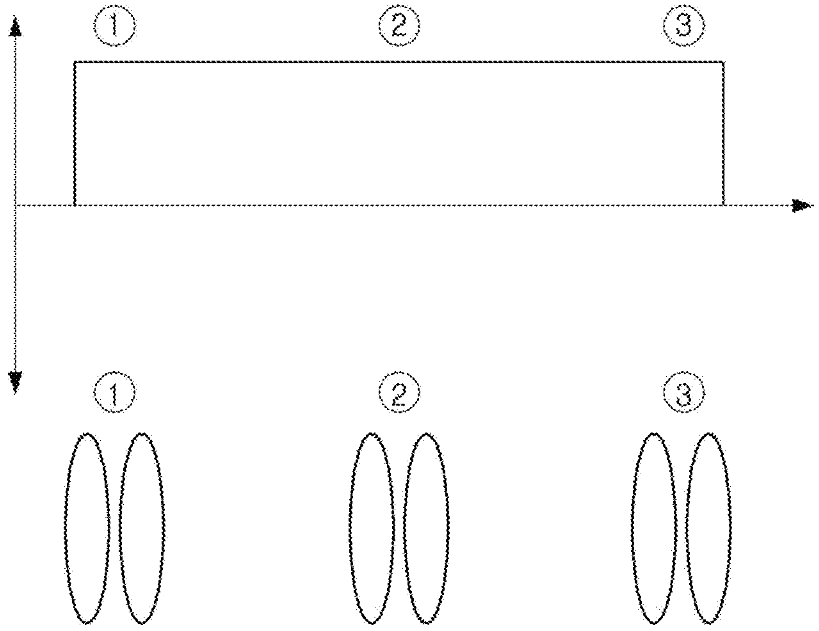
FIG. 4 is a diagram conceptually illustrating the orientation of the anode active materials when a magnetic field having constant magnetic force strength and a direction of a line of magnetic force is applied.

FIG. 4 is a diagram conceptually illustrating the orientation of the anode active materials when a magnetic field having constant magnetic force strength and a direction of a line of magnetic force as described above is applied. As can be seen from FIG. 4, when the direction of the line of magnetic force applied to the anode current collector has a constant direction regardless of the position along the traveling direction of the anode current collector, the anode active materials are simply oriented in a perpendicular direction with respect to the anode current collector.

Accordingly, in order to develop the pores in the anode mixture layer, the magnetic field in which the direction of the line of magnetic force and the magnetic force strength change may be applied to the anode current collector. In this way, by applying the magnetic field in which the direction of the line of magnetic force and the magnetic force strength changes, the perpendicular orientation of the anode active materials to the anode current collector increases and as the magnetic force strength and the direction of the line of magnetic force change during the application of the magnetic field, so the gap between the anode active materials may increase and the pores in the anode mixture layer may be developed. Furthermore, the developed pores are oriented in the perpendicular direction with respect to the anode current collector, so the orientation of the pores may increase, thereby increasing the Z-tensor.

Figure 5A:
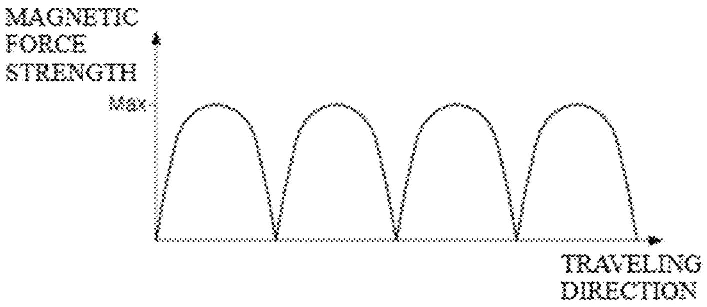
FIGS. 5A to 5C are diagrams conceptually illustrating a change pattern of magnetic force strength and a direction of a line of magnetic force with respect to a magnetic field in which the magnetic force strength and the direction of the line of magnetic force change according to an electrode traveling direction, and an orientation change of the anode active material accordingly.
Figure 5B:
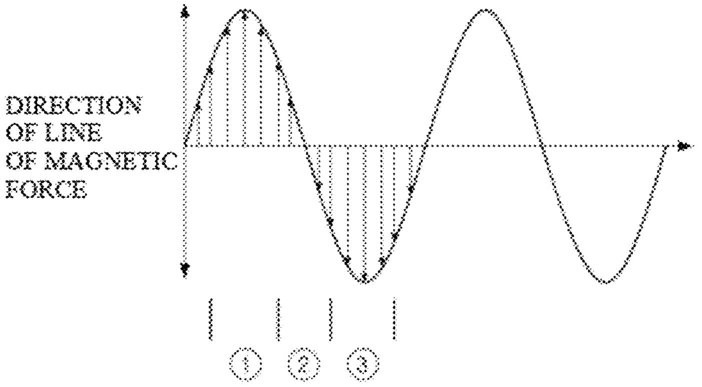
Figure 5C:
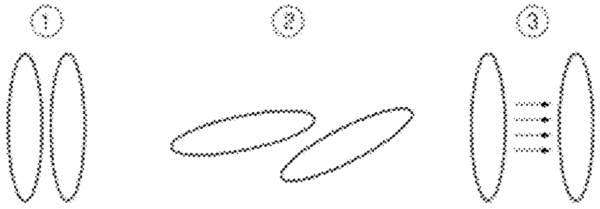

For example, the magnetic field may be a magnetic field having magnetic force strength and a direction of a line of magnetic force as illustrated in FIGS. 5A to 5C. Specifically, FIG. 5A is a diagram illustrating the change in the magnetic force strength according to the traveling direction of the anode current collector, and as illustrated in FIG. 5A, a pattern in which the magnetic force strength may gradually increase to reach the maximum magnetic force strength, and then decrease may be repeatedly generated.

In addition, FIG. 5B is a diagram schematically illustrating the change in the direction of the line of magnetic force according to the traveling direction of the anode current collector along with the change in the magnetic force strength. As illustrated in FIG. 5B, in one section having the pattern in which the magnetic force strength increases and decreases, for example, the magnetic field of the line of magnetic force from the lower surface toward the upper surface of the anode current collector may be formed, and the magnetic field having the direction of the line of magnetic force from the upper surface toward the lower surface of the anode current collector in the next section having the pattern in which the magnetic force strength increases and decreases may be formed.

In this way, the magnetic force strength of the magnetic field periodically changes to repeatedly increase and decrease, and in a cycle in which one magnetic force strength changes, a first line of magnetic force directed in the same direction is formed, and in the next cycle in which the magnetic force strength changes, a second line of magnetic force directed in a direction opposite to the first direction of line of magnetic force is formed, so the orientation of the anode active materials may change according to the direction of the line of magnetic force, and a space between the anode active materials may be formed by the change in the orientation of the anode active material, thereby facilitating the development of the pores in the anode mixture layer and improving the orientation of the pores.

Meanwhile, as illustrated in FIG. 5B, the magnetic field applied to the anode current collector may be a magnetic field in which the direction of the line of magnetic force is applied in the perpendicular direction with respect to the anode current collector. As the magnetic field is applied in the perpendicular direction with respect to the anode current collector, the pores may be oriented in the perpendicular direction with respect to the anode current collector. Accordingly, it is preferable that the magnetic field does not have the line of magnetic force directed in the horizontal direction. When the direction of the line of magnetic force is formed in the horizontal direction, the anode active materials may be oriented in the horizontal direction, thereby inhibiting the development of the pores and the perpendicular orientation of the pores.

The magnetic field applied to the anode mixture layer may have the change in the line of magnetic force in the form of a sine wave as illustrated in FIG. 5B due to the change in the magnetic force strength and the change in the direction of the line of magnetic force accordingly. Specifically, referring to FIG. 5B, the magnetic force strength increases and then decreases while the magnetic field is applied from the lower surface toward the upper surface of the anode current collector according to the traveling direction of the anode current collector, and as the magnetic force strength meets the X-axis, and the direction of the line of magnetic force changes, the magnetic field is applied in the negative direction of the Y axis, for example, in the direction from the upper surface toward the lower surface of the anode current collector, and the magnetic force strength increases and then decreases. Specifically, the magnetic field may change by gradually increasing and decreasing the magnetic force strength as illustrated by arrows directed up and down in FIG. 5B. In this case, the direction of line of magnetic force changes, but is formed in the perpendicular direction with respect to the anode current collector, and the maximum magnetic force strength periodically appearing according to the change in the magnetic force strength may be the same.

The development of the pores and the change in the orientation of the pores according to the periodic change in the magnetic force strength and the direction of the line of magnetic force are schematically illustrated in FIG. 5C. As illustrated in FIG. 5C, the anode active materials may be oriented toward the upper surface of the anode current collector as in ① by the magnetic field having the direction of the line of magnetic force from the lower surface toward the upper surface of the anode current collector, and after the anode active material is oriented in the same direction as ② by the line of magnetic force from the upper surface toward the lower surface of the anode current collector according to the change in the magnetic force strength and the direction of the line of magnetic force depending on the traveling direction of the anode current collector, the orientation of the anode active materials may change from the upper surface toward the lower surface of the anode current collector in the same direction as ③. In this way, the anode active materials may be spaced apart from each other according to such a change in the orientation of the anode active materials to form the space between the anode active materials, thereby developing the pores in the anode mixture layer and improving the orientation of the pores.

In this way, the orientation of the anode active materials changes according to the change in the magnetic force strength and the direction of the line of magnetic force according to the traveling direction of the anode current collector to secure the space between the anode active materials, thereby forming the pores between the anode active materials and improving the orientation of the pores.

As described above, in the magnetic field applied to the anode mixture layer, the strength of the magnetic force and the direction of the line of magnetic force may change at a constant cycle as the anode current collector moves or travels through the magnetic field. That is, the cycle of the change in the magnetic force strength and the direction of line of magnetic force of the magnetic field is not limited thereto, but may be, for example, 100 mm to 1000 mm of movement of the anode current collector through the magnetic field. For example, when the change cycle is 100 mm, the magnetic field having the same magnitude of magnetic force and direction of the line of magnetic force may be applied to the anode current collector whenever the anode current collector moves by 100 mm. When the change cycle of the magnetic field is less than 100 mm, it may be difficult to secure the distance between the anode active materials because the magnetic field is not sufficiently applied. On the other hand, when the change cycle of the magnetic field exceeds 1000 mm, the number of rotations of the anode active material decreases, so pores may not be sufficiently developed.

The anode in which the anode mixture layer is formed on the anode current collector may be prepared by applying the anode mixture slurry including the anode active material to at least one surface of the anode current collector and rolling and drying the anode mixture slurry.

In this case, the anode mixture slurry may be applied to the anode current collector under the application of the magnetic field in which the magnetic force strength and the direction of line of magnetic force change as described above and dried to orient the pores in the anode mixture layer, or the anode mixture slurry may be applied to the anode current collector and then the magnetic field may be applied during drying of the anode mixture slurry to orient the pores in the anode mixture layer.

The magnetic field may be applied from both the upper and lower sides with respect to the traveling direction of the anode current collector. The line of magnetic force of the magnetic field in the perpendicular direction with respect to the traveling direction of the anode current collector may be applied by applying the magnetic field from both the upper and lower surfaces of the anode current collector, so it is possible to orient the pores in the perpendicular direction with respect to the traveling direction of the anode current collector, and as illustrated in FIG. 4, it is possible to significantly increase the magnetic force strength of the magnetic field compared to a case in which a magnetic field having a constant magnetic force strength and direction of line of magnetic force is applied.

The magnetic field applied in the present disclosure may have maximum magnetic force strength of 4,000 G or more, for example, 4,500 G or more, 5,000 G or more, 5,500 G or more, 6,000 G or more, 6,500 G or more, 7,000 G or more, and 8,000 G or more. On the other hand, as the maximum magnetic force strength increases, the formation of the pores in the anode mixture layer and the degree of orientation of the pores may be improved, but the maximum magnetic force strength is not particularly limited, and may be 12,000 G or less, for example, 10,000 G or less.

In addition, the magnetic field may be applied to the anode mixture layer for 1 second or more, for example, 1.5 seconds or more, 2 seconds or more, 3 seconds or more, or 4 seconds or more, and may be applied for 30 seconds or less, for example, 25 seconds or less, 20 seconds or less, 15 seconds or less, or 10 seconds or less.

By applying the magnetic field in which the magnetic force strength and the direction of line of magnetic force change according to the exemplary embodiment in the present disclosure, it is possible to secure the space between the anode active materials in the anode mixture layer at the same residence time, and improve the orientation of the pores.

The viscosity of the anode mixture slurry may affect the orientation of the anode active material by the application of the magnetic field. For example, as the viscosity of the anode mixture slurry decreases, the resistance to the flow of the anode mixture decreases even if the magnetic force strength and the magnetic field application time are the same, so it is easy to increase the orientation of the anode active materials and pores in the perpendicular direction with respect to the anode current collector.

As an exemplary embodiment, the anode mixture slurry may have a viscosity of 300,000 cp or less when measured at 25° C. and a shear rate of 0.10. As described above, when the viscosity of the anode mixture slurry is high, it is not easy to orient the anode active materials in the anode mixture slurry in the perpendicular direction, but by applying the magnetic field according to an exemplary embodiment in the present disclosure, the maximum magnetic force strength may increase, so even when the viscosity of the anode mixture slurry is high, the pores may be perpendicularly oriented.

The viscosity of the anode mixture slurry may be, for example, 150,000 cp or less, 130,000 cp or less, 100,000 cp or less, 75,000 cp or less, 50,000 cp or less, 35,000 cp or less, 30,000 cp or less, 27,500 cp or less, and 25,000 cp or less.

In general, as the anode active material, a Si-based anode active material is known to have a large volume change. In general, when a silicon-based anode active material is added together with a carbon-based anode active material such as graphite, carbon nanotubes may be included as a conductive agent in terms of preventing swelling due to volume expansion. As such, when the Si-based anode active material as the anode active material and the carbon nanotubes as the conductive agent are included, the viscosity of the slurry increases. Therefore, there is a case in which the solid content is reduced to improve the perpendicular orientation of the graphite-based anode active material by the magnetic field, and such reduction in the solid content may lead to the decrease in capacity. However, by applying a magnetic field having high magnetic force strength according to an exemplary embodiment provided in the present disclosure, even when the slurry having a high viscosity as described above is used, it is possible to improve the orientation of the pores.

Meanwhile, the lower limit of the viscosity of the anode mixture slurry is not particularly limited, but may be 5,000 cp (25° C. and shear rate 0.1 $s^{-1}$) or more. When the viscosity of the anode mixture slurry is too low, the anode active material in the anode mixture slurry may easily be precipitated.

The drying process is a process for removing a solvent included in an anode mixture. In this case, since the drying means is not particularly limited, a conventional drying means may be applied, and for example, heat drying such as hot air drying may be used.

The drying process is not particularly limited, but may be performed for 20 to 300 seconds, for example, 40 to 240 seconds and 60 to 200 seconds within a range of, for example, 60 to 180° C. and preferably 70 to 150° C.

The rolling process may be performed after the drying process, and the thickness or density of the anode mixture layer may be adjusted through the rolling process. The rolling process may be performed by the conventional method such as a roll press method or a flat plate press method, and by the rolling process, the anode mixture layer may be prepared to a thickness of 20 μm or more and 120 μm or less per side, for example, 40 μm or more, 100 μm or less, or 60 μm or more, 80 μm or less.

In this way, by applying the magnetic field, in which the magnetic force strength and the direction of line of magnetic force periodically change, to both the upper and lower sides of the traveling direction of the anode current collector, the formation of the pores in the anode mixture layer may be enhanced, and the orientation of the pores in the perpendicular direction with respect to the upper and lower surfaces of the anode current collector may be controlled, thereby obtaining the anode having a Z-tensor value of 0.25 or more.

The anode obtained by rolling may be a high-density electrode having an anode mixture layer having a density of 1.5 $g/cm^3$ or more. For example, the density of the anode mixture layer may be 1.5 $g/cm^3$ or more, 2.2 $g/cm^3$ or less, or 1.5 $g/cm^3$ or more, 2.0 $g/cm^3$ or less.

The anode for a secondary battery prepared according to the method for preparing an anode for a secondary battery described above is an anode mixture layer including pores having a Z-tensor value of 0.25 or more of Z-orientation on at least one surface of the anode current collector.

In the present disclosure, the anode mixture layer may be formed by applying an anode mixture including an anode active material, a conductive agent, a binder, and a solvent to the anode current collector. In addition, the anode mixture layer may further include additives such as a thickener if necessary.

The anode active material may be a carbon-based anode active material. The carbon-based anode active material may be suitably used in the present disclosure as long as it is commonly used in the preparing of the anode for a secondary battery. The carbon-based anode active material is not particularly limited, but may be artificial graphite, natural graphite, or a mixture of artificial graphite and natural graphite. Crystalline carbon-based active materials, such as artificial graphite or a mixture of artificial graphite and natural graphite, have more developed crystallographic properties of particles than an amorphous carbon-based active material. Therefore, when such a crystalline carbon-based active material is used as the anode active material, it is possible to improve the orientation of the pores because the orientation characteristics of the carbon material in the anode mixture layer with respect to an external magnetic field may be further improved.

The form of the artificial graphite or the natural graphite may be amorphous, plate-like, flake-like, spherical, fibrous, or a combination thereof. In addition, when the artificial graphite and natural graphite are mixed and used, the mixing ratio may be 70:30 to 95:5 by wt %.

In addition, the anode active material may further include at least one of a silicon (Si)-based anode active material, a tin (Sn)-based anode active material, or a lithium vanadium oxide anode active material together with the carbon-based anode active material. When the anode active material further includes the above-described active material, the anode active material may be included in the range of 1 to 50 wt % based on the total weight of the anode active material.

The Si-based anode active material may be Si, a Si—C composite, SiOx ($0<x<2$), or a Si-Q alloy. In the Si-Q alloy, Q may be, other than Si, an element selected from the group consisting of alkali metals, alkaline earth metals, Group 13 elements, Group 14 elements, Group 15 elements, Group 16 elements, transition metals, rare earth elements, and combinations thereof. Specifically, Q may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Jr, Pd, Pt, Cu, Ag, Au, Zn, Cd, B, Al, Ga, Sn, In, Tl, Ge, P, As. Q may be selected from the group consisting of Sb, Bi, S, Se, Te, Po, and combinations thereof.

The Sn-based anode active material may be Sn, $SnO_2$, or a Sn-R alloy. In the Sn-R alloy, R may be, other than Sn and Si, an element selected from the group consisting of alkali metals, alkaline earth metals, Group 13 elements, Group 14 elements, Group 15 elements, Group 16 elements, transition metals, rare earth elements, and combinations thereof. Specifically, Q may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Jr, Pd, Pt, Cu, Ag, Au, Zn, Cd, B, Al, Ga, Sn, In, Tl, Ge, P, As. Q may be selected from the group consisting of Sb, Bi, S, Se, Te, Po, and combinations thereof. In addition, at least one of these elements and $SiO_2$ may be mixed and used.

The content of the anode active material in the anode mixture layer may be 94 to 98 wt % based on the total weight of the anode mixture layer.

The conductive material is used to impart conductivity to the electrode, and may be used without limitation as long as it is commonly used in secondary batteries. As examples of the conductive material may include carbon-based materials such as natural graphite, artificial graphite, carbon black, acetylene black, ketjen black, carbon fibers, and carbon nanotubes; metal-based materials, such as metal powders, such as copper, nickel, aluminum, and silver, or a metal fiber; conductive polymers such as polyphenylene derivatives; or conductive materials including a mixture thereof.

The content of the conductive agent may be 0.1 to 3 wt % based on the total weight of the anode mixture layer.

The anode mixture layer may include a binder. The binder serves to bind the anode active material particles to each other, and also serves to bind the anode active material to the anode current collector. Examples of the binder may include, but not limited to, an aqueous binder.

Examples of the aqueous binder may include styrene-butadiene rubber, acrylated styrene-butadiene rubber (SBR), acrylonitrile-butadiene rubber, acrylic rubber, butyl rubber, an ethylene-propylene copolymer, polyepichlorohydrin, polyphosphazene, polyacrylonitrile, polystyrene, an ethylene-propylene-diene copolymer, polyvinylpyridine, chlorosulfonated polyethylene, latex, a polyester resin, an acrylic resin, a phenol resin, an epoxy resin, a polyvinyl alcohol resin, an acrylate-based resin, or combinations thereof.

The content of the binder may be 1.5 to 3 wt % based on the total weight of the anode mixture layer.

The anode mixture layer may further include a thickener for imparting viscosity along with the binder. The thickener may include a cellulose-based compound, and examples of the thickener may include a mixture of one or more of carboxymethyl cellulose, hydroxypropyl methyl cellulose, methyl cellulose, alkali metal salts thereof, or the like. As the alkali metal, Na, K, or Li may be used. The thickener may be used in an amount of 0.1 to 3 parts by weight based on 100 parts by weight of the anode active material.

The solvent may be an aqueous solvent such as water.

In the present disclosure, as the anode current collector, at least one selected from the group consisting of copper foil, nickel foil, stainless steel foil, titanium foil, nickel foam, copper foam, a polymer substrate coated with a conductive metal, and combinations thereof may be used. The thickness of the anode current collector is not particularly limited, and may be, for example, 5 to 30 μm.

In the anode provided by an exemplary embodiment in the present disclosure, the anode active materials and pores in the anode mixture layer, especially pores, may be oriented in the perpendicular direction with respect to the anode current collector to facilitate the diffusion of the lithium ions into the electrode and improve the charge and discharge efficiency at a high C-rate, thereby improving the quick charging performance.

The secondary battery may be prepared using the anode in which the pores are perpendicularly oriented as described above. The secondary battery may be prepared by manufacturing an electrode assembly by alternately stacking the anode and cathode as described above with a separator as a boundary, inserting and sealing the anode into a battery case, and injecting an electrolyte.

Hereinafter, the cathode will be described in more detail. The cathode is not particularly limited, but the cathode mixture layer is formed by applying cathode mixture slurry to at least one surface of the cathode current collector and drying and rolling the cathode mixture slurry, and when it is a cathode commonly used in secondary batteries, it may be suitably used in the present disclosure.

The cathode mixture slurry may include the cathode active material, the binder, and the solvent, and may include the conductive agent and the thickener as necessary.

As the cathode active material, the compound capable of reversible insertion and desorption of lithium (a lithiated intercalation compound) may be used. Specifically, at least one of a complex oxide of lithium and a metal selected from cobalt, manganese, nickel, and combinations thereof may be used.

A more specific example may be a lithium transition metal compound (oxide) having a layered structure as represented by a general formula $LiMO_2$, where M may include at least one of transition metal elements such as Ni, Co, and Mn, and may further include other metal elements or non-metal elements. Examples of the composite oxide may include a monolithic lithium transition metal composite oxide containing one type of the transition metal element, a so-called binary lithium transition metal composite oxide containing two types of the transition metal element, and a ternary lithium transition metal composite oxide containing Ni, Co and Mn as constituent elements as transition metal elements, and more specifically, a ternary lithium transition metal composite oxide such as $Li(Ni_{1/3}Co_{1/3}Mn_{1/3})O_2$.

In addition, a lithium transition metal compound (oxide) represented by the general formula $Li_2MO_3$, wherein M includes at least one of transition metal elements such as Mn, Fe, and Co, and may further include another metal element or a non-metal element, for example, $Li_2MnO_3$, $Li_2PtO_3$, etc.

Also, the cathode active material may be a solid solution of $LiMO_2$ and $Li_2MO_3$, and may be a solid solution represented by, for example, $0.5LiNiMnCoO_2$-$0.5Li_2MnO_3$.

Furthermore, a material having a coating layer on the surface of the cathode active material may be used, or a mixture of the compound and a compound having a coating layer may be used. The coating layer may include at least one coating element compound selected from the group consisting of oxide, hydroxide, oxyhydroxide, oxycarbonate, and hydroxycarbonate of a coating element. The compound constituting these coating layers may be amorphous or crystalline. As the coating element included in the coating layer, Mg, Al, Co, K, Na, Ca, Si, Ti, V, Sn, Ge, Ga, B, As, Zr, or a mixture thereof may be used.

In the cathode, the cathode active material may be 90 to 98 wt % based on the weight of the solid content of the cathode mixture.

The binder may serve to bind particles of the cathode active material to each other and also to bind the cathode current active material to the cathode current collector, and the content of the binder may be 1.5 to 5 wt % based on the weight of the solid content of the cathode mixture.

Examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, etc.

The cathode mixture slurry may also include a thickener to impart viscosity along with the binder. The thickener may be the same as the thickener included in the anode mixture, and may be included in an amount of 0.1 to 3 parts by weight based on 100 parts by weight of the cathode active material.

The conductive agent is used to impart conductivity to the cathode, and any electron conductive material commonly used in the cathode of the secondary battery may be suitably used, and the conductive agent used in the anode mixture may be used. The conductive agent may be used in an amount of 0.1 to 5 wt % based on the weight of the solid content of the cathode mixture.

As the solvent, an aqueous solvent such as water and a non-aqueous solvent may be used. The non-aqueous solvent may be used in the present disclosure as long as it is commonly used to prepare the cathode mixture of the secondary battery. Examples of the non-aqueous solution may include N-methyl-2-pyrrolidone (NMP), but is not limited thereto.

As the cathode current collector, a metal having good conductivity, for example, aluminum, nickel, titanium, stainless steel, etc., may be used, and may be in various forms such as a sheet type, a thin type, and a mesh type. The thickness of the cathode current collector is not particularly limited, and may be, for example, 5 to 30 μm.

As described above, the cathode in which the cathode mixture layer is formed on the cathode current collector may be prepared by applying the cathode mixture slurry to at least one surface of the cathode current collector and drying and rolling the cathode mixture slurry.

The drying and rolling process may be performed by the same method as that of the anode, and a detailed description thereof will be omitted.

A separator interposed between the cathode and the anode may be formed of a porous sheet, non-woven fabric, etc., and may be a multilayer film of polyethylene, polypropylene, polyvinylidene fluoride, or two or more layers of thereof, a mixed multilayer film of two layers of polyethylene/polypropylene, a mixed multilayer film of three layers of polyethylene/polypropylene/polyethylene, a mixed multilayer film of three layers of polypropylene/polyethylene/polypropylene, and the like, and furthermore, may be provided with a porous heat-resistant layer on one or both surfaces of the porous sheet or the nonwoven fabric. The separator is not particularly limited, but, for example, a separator having a thickness of about 10 to 40 μm may be used.

The electrolyte includes a non-aqueous organic solvent and a lithium salt. The non-aqueous organic solvent serves as a medium through which ions involved in the electrochemical reaction of the battery may move. For example, as a carbonate-based, ester-based, ether-based, ketone-based, alcohol-based, or aprotic solvent, those commonly used in lithium ion secondary batteries may be used, and the organic solvents may be used alone or in combination of one or more.

The lithium salt is dissolved in an organic solvent, and serves as a source of lithium ions in the battery to enable an operation of a basic lithium ion secondary battery, and promotes movement of lithium ions between the cathode and the anode. Examples of the lithium salt that promotes the movement of lithium ions between the cathode and anode may include one or more selected from the group consisting of $LiPF_6$, $LiBF_4$, $LiSbF_6$, $LiAsF_6$, $LiN(SO_2C_2F_5)_2$, $Li(CF_3SO_2)2N$, $LiN(SO_3C_2F_5)_2$, $LiC_4F_9SO_3$, $LiClO_4$, $LiAlO_2$, $LiAlCl_4$, and $LiN(C_xF_{2x+1}SO_2)(C_yF_{2y+1}SO_2)$ (where, x and y are each independently an integer from 1 to 20), LiCl, LiI, and $LiB(C_2O_4)_2$ (lithium bis(oxalato) borate LiBOB). The concentration of the lithium salt is not particularly limited, but it may be used within the range of 0.1 M to 2.0 M. The electrolyte may further include vinylene carbonate or ethylene carbonate-based compound as necessary to improve battery life.

As the anode according to the present disclosure, a secondary battery including an anode for a lithium secondary battery in which the orientation of the pores in the anode mixture layer is predominant in the Z axis, that is, the Z-orientation value of the pores in the anode mixture layer is 0.25 or more facilitates the diffusion of the lithium ions into the electrode during the charging and discharging to reduce the resistance of the battery, and in particular, improve the charge and discharge efficiency at a high C-rate, thereby improving the cycle life characteristics and quick charging performance.

EXAMPLE

Hereinafter, the present disclosure will be described in more detail reference to with examples. However, the following examples show a specific example of the present disclosure, and are not intended to limit the present disclosure.

Preparation of Anode

Example 1-1

Anode mixture slurry in which 89.3 wt % of artificial graphite, 5 wt % of silicon oxide, 1.5 wt % of styrene butadiene rubber, 1.2 wt % of carboxymethyl cellulose, and 3 wt % of carbon nanotubes (CNT) were mixed in water, and a viscosity value measured at 25° C. and a shear rate of 0.1 $s^{-1}$ is 26,000 cp was prepared.

Each of the prepared anode mixture slurries was applied to the upper and lower surfaces of the anode current collector of Cu foil to a thickness of 200 μm, and the anode current collector was dried by passing through a drying device.

The drying device included neodymium magnets installed on both upper and lower surfaces thereof, respectively, and applied a magnetic field having a direction of a line of magnetic force perpendicular to the anode current collector for 2 seconds by the magnets. In this case, the maximum magnetic force of the magnetic field was 4000 G, and the magnetic force strength and the direction of the line of magnetic force changed whenever the anode current collector travelled or moved 200 mm in a travelling direction. The change in orientation (PO change value) of graphite particles, which is the anode active material of the anode mixture layer was measured using X-ray diffraction (XRD) for the prepared anode, and the results are shown in Table 1. The PO change value is shown by measuring the PO values before and after applying the magnetic field, respectively, and calculating the change in the PO values.

Furthermore, the 3-D Z-tensor value of the pores formed in the anode mixture layer was evaluated using an X-ray microscope (Xraida 520 Versa from Zeiss, 3-D rendering software: GEODICT), and the results are shown in Table 1.

Example 1-2

An anode was prepared in the same manner as in Example 1-1, except that a magnetic field having a maximum magnetic force of 8000G was applied.

For the prepared anode, the change in the orientation (PO value) of the anode active material of the anode mixture layer and the 3-D Z-tensor value of the pores formed in the anode mixture layer were evaluated, and the results are shown in Table 1.

Comparative Example 1

An anode was prepared in the same manner as in Example 1-1 except that no magnetic field was applied.

For the prepared anode, the change in the orientation (PO value) of the anode active material of the anode mixture layer and the 3-D Z-tensor value of the pores formed in the anode mixture layer were evaluated, and the results are shown in Table 1.

Example 2-1

An anode was prepared in the same manner as in Example 1-1, except that anode mixture slurry having a slurry viscosity of 34,000 cp was prepared and used.

For the prepared anode, the change in the orientation (PO value) of the anode active material of the anode mixture layer and the 3-D Z-tensor value of the pores formed in the anode mixture layer were evaluated, and the results are shown in Table 1.

Example 2-2

An anode was prepared in the same manner as in Example 2-1, except that a magnetic field having a maximum magnetic force of 8000G was applied.

For the prepared anode, the change in the orientation (PO value) of the anode active material of the anode mixture layer and the 3-D Z-tensor value of the pores formed in the anode mixture layer were evaluated, and the results are shown in Table 1.

Comparative Example 2

An anode was prepared in the same manner as in Example 2-1 except that no magnetic field was applied.

For the prepared anode, the change in the orientation (PO value) of the anode active material of the anode mixture layer and the 3-D Z-tensor value of the pores formed in the anode mixture layer were evaluated, and the results are shown in Table 1.

Example 3-1

An anode was prepared in the same manner as in Example 1-1, except that anode mixture slurry having a slurry viscosity of 130,000 cp was prepared and used.

For the prepared anode, the change in the orientation (PO value) of the anode active material of the anode mixture layer and the 3-D Z-tensor value of the pores formed in the anode mixture layer were evaluated, and the results are shown in Table 1.

Example 3-2

An anode was prepared in the same manner as in Example 3-1, except that a magnetic field having a maximum magnetic force of 8000G was applied.

For the prepared anode, the change in the orientation (PO value) of the anode active material of the anode mixture layer and the 3-D Z-tensor value of the pores formed in the anode mixture layer were evaluated, and the results are shown in Table 1.

Comparative Example 3

An anode was prepared in the same manner as in Example 3-1 except that no magnetic field was applied.

For the prepared anode, the change in the orientation (PO value) of the anode active material of the anode mixture layer and the 3-D Z-tensor value of the pores formed in the anode mixture layer were evaluated, and the results are shown in Table 1.

Manufacturing of Battery

A cathode mixture was prepared by mixing 96 wt % of cathode active material of $Li(Ni_{0.8}Co_{0.1}Mn_{0.1})O_2$, 2 wt % of a CNT conductive agent, and 2 wt % of polyvinylidene fluoride binder in an N-methylpyrrolidone solvent. The prepared cathode mixture was coated on both sides of the cathode current collector of Al foil, and dried and rolled to prepare a cathode.

Lithium ion secondary batteries were respectively prepared by injecting a mixed solvent (50:50 volume ratio) of ethylene carbonate and diethyl carbonate in which 1M $LiPF_6$ was dissolved after the prepared cathode and the prepared anode in each of the Examples and Comparative Examples are alternately stacked with a separator as a boundary, inserted into a pouch, and sealed.

The DR-IR, quick charging time, and capacity retention at 300 cycles were measured for each of the prepared secondary batteries, and the results are shown in Table 1. Each battery characteristic was performed in the following manner.

DR-IR: The resistance value was measured at 50% of the state of charge (SOC) using a cell charger/discharger.

Quick charging time: A cell having a large capacity of 10 Ah or more was manufactured using the anode and the same cathode prepared according to Examples and Comparative Examples. In this case, a reference electrode was inserted between the cathode and the anode to manufacture a three-electrode cell, so the potential of the anode was confirmed during the charging.

While the three-electrode cell into which the reference electrode is inserted to 4.2V is CC-charged at a C-rate in the range of 0.75 to 2.5C, a operation-charging protocol of the Comparative Examples and the Examples was configured by finding an SOC point where the CCV value of the anode for each C-rate becomes constant at OV or less and designating this point as the charging limit. The charging time of the Comparative Examples and the Examples was calculated by the operation charging protocol prepared using the three-electrode cell.

Capacity retention rate: high C-rate (2.5C) charging and discharging (0.3C) were repeated, and the capacity retention rate at 300 cycles was measured.

active materials, so it indicates that the active materials are oriented in a horizontal direction with respect to the anode current collector, and the larger the value, the greater the change in orientation, so it indicates that the anode active materials are oriented in the perpendicular direction.

As can be seen from Table 1, in the anode of each embodiment prepared by the application of the magnetic field, it could be seen that the anode active materials and the pores are oriented in the perpendicular direction with respect to the anode current collector, and all of them have a Z-tensor value of 0.25 or more. The batteries manufactured using the anode of each of these examples showed a significantly smaller DR-IR value of 1.255 mil or less than each comparative example, shortened the quick charging time, and also showed the high capacity retention rate.

Meanwhile, it could be seen that Examples 1-1 and 2-1 have smaller PO change values than Examples 1-2 and 2-2, and the orientation is less developed in the perpendicular direction with respect to the anode current collector of the anode active material compared to Examples 1-2 and 2-2. Meanwhile, it was confirmed that Examples 1-1, 1-2, 2-1, and 2-2 all had a Z-tensor value of 0.25 or more, and thus the pore orientation showed excellent results. However, Examples 1-2 and 2-2 showed a higher Z-tensor value than Examples 1-1 and 2-1, and it was evaluated that the orientation of the pores in the perpendicular direction to the anode current collector was good.

In addition, Examples 3-1 and 3-2 showed that the PO change value is very small, which is determined that it is difficult to orient the anode active materials by the application of the magnetic field as in Examples 3-1 and 3-2 because the viscosity of the anode mixture slurry is high. However, even though the anode active materials were hardly oriented, the anodes of Examples 3-1 and 3-2 all had a high Z-tensor value of 0.25 or more, and compared to the anode of Comparative Example 3, it could be seen that the resistance during the charging and discharging of the battery is small, the quick charging time is short, and the capacity retention rate is significantly high, and thus, the battery performance is excellent.

From the results of Examples 3-1 and 3-2, despite the small change in the orientation of the anode active materials

TABLE 1

| Division | Maximum magnetic force strength(G) | Viscosity (cp) (25° C., $0.1s^{-1}$) | PO change | Z-tensor | DR-IR (mΩ) | Quick charging time (min) | Capacity retention rate % (@ 300 cycle) |
|---|---|---|---|---|---|---|---|
| Comparative Example 1 | X | 26,000 | 0.00 | 0.20 | 1.408 | 24.3 | 81.2 |
| Example 1-1 | 4000 | | 0.09 | 0.30 | 1.255 | 22.7 | 95.3 |
| Example 1-2 | 8000 | | 0.28 | 0.33 | 1.096 | 19.5 | 97.5 |
| Comparative Example 2 | X | 34,000 | 0.00 | 0.20 | 1.409 | 24.5 | 82.5 |
| Example 2-1 | 4000 | | 0.06 | 0.29 | 1.245 | 22.0 | 94.5 |
| Example 2-2 | 8000 | | 0.18 | 0.30 | 1.088 | 19.4 | 97.3 |
| Comparative Example 3 | X | 130,000 | 0.00 | 0.20 | 1.398 | 24.9 | 81.9 |
| Example 3-1 | 4000 | | 0.01 | 0.25 | 1.244 | 22.1 | 94.9 |
| Example 3-2 | 8000 | | 0.01 | 0.31 | 1.079 | 19.5 | 97.2 |

As the PO value indicating the orientation of the active materials approaches 0, it indicates that the active materials are oriented in a perpendicular direction with respect to the anode current collector. In Table 1, the difference in the orientation before and after the application of the magnetic field was shown as the PO change value. The closer the PO value to 0, the less the degree of orientation of the anode in the perpendicular direction with respect to the anode current collector, the pores in the anode mixture layer are oriented in the perpendicular direction with respect to the anode current collector, and thus, when the Z-tensor value has a large value of 0.25 or more, it indicates that the battery performance is improved, and it is determined that the orientation of the pores rather than the orientation of the active materials is a factor directly related to the battery performance.

Conventionally, it was thought that when the anode active materials are oriented in the perpendicular direction with respect to the anode current collector, the movement path of the lithium ions may be shortened to improve the battery characteristics. However, it was confirmed that the results of Comparative Examples 3, 3-1 and 3-2 as described above show higher battery characteristics when the pores in the anode mixture layer are oriented, not the orientation of the anode active materials in the anode mixture layer, which is contrary to the conventional expectation.

In addition, the anodes of Examples 1-1 and 2-1 are anodes that have the maximum magnetic force strength of 4000G, and prepared by applying the magnetic field in which the magnetic force strength and the direction of the line of magnetic force change, and the anodes of Example 1-2 and 2-2 are anodes that have the maximum magnetic force strength of 8000G, and prepared by applying the magnetic field in which the magnetic force strength and the direction of the line of magnetic force change. Since the higher the maximum magnetic force strength, the higher the Z-tensor value, it could be seen that the orientation of the pores may be improved.

As set forth above, according to an exemplary embodiment in the present disclosure, it is possible to improve orientation of pores included in an anode mixture layer and shorten a movement path of lithium ions to an inside of an anode during charging and discharging by predominantly orienting pores in a perpendicular direction with respect to an anode current collector.

In addition, according to another exemplary embodiment in the present disclosure, it is possible to suppress lithium plating from occurring and improve quick charging performance by orienting pores in an anode mixture layer in a perpendicular direction with respect to an anode current collector.

In addition, according to another exemplary embodiment in the present disclosure, it is possible to improve orientation of pores in an anode mixture layer by applying a magnetic field having greater strength even under the same condition.

In addition, according to another exemplary embodiment in the present disclosure, it is possible to shorten a movement path of lithium ions and improve charging and discharging characteristics at a high C-rate by securing pores between anode active materials and orientation of the pores even after rolling the anode active materials.

What is claimed is:

1. An anode for a secondary battery, comprising:

an anode mixture layer provided on at least one surface of an anode current collector, wherein the anode mixture layer includes anode active material mixture comprising a carbon-based anode active material and a silicon (Si)-based anode active material, wherein the Si-based anode active material comprises at least one of Si, a Si-C composite, and SiOx ($0<x<2$), wherein a z-tensor value of a pore in the anode mixture layer, obtained by evaluating an orientation tensor in each axial direction, after three-dimensionally imaging the pores inside the anode mixture layer formed by applying a magnetic field thereto using an X-ray microscope, is 0.25 or more.

2. The anode of claim 1, wherein the anode mixture layer has an electrode density of 1.50 g/cc or more.

3. The anode of claim 1, wherein the anode mixture layer includes artificial graphite, natural graphite, or a mixture thereof as the carbon-based anode active material.

4. The anode of claim 1, wherein the carbon-based anode active material is an amorphous material, a plate-like material, a flake-like material, a spherical, a fibrous material, or a mixture of at least two thereof.

5. The anode of claim 1, wherein the anode mixture layer includes 94 to 98 wt % of the anode active material mixture, 0.1 to 3 wt % of a conductive agent, and 1.5 to 3 wt % of a binder based on a total weight of the anode mixture layer.

6. A method for preparing an anode, comprising the steps of:

(A) forming an anode mixture layer by coating an anode mixture slurry including the anode active material mixture on at least one surface of an anode current collector; and (B) applying a magnetic field to the anode mixture layer to change an orientation of a pore between the anode active materials, wherein the anode active material mixture comprises a carbon-based anode active material and a silicon (Si)-based anode active material, wherein the Si-based anode active material comprises at least one of Si, a Si-C composite, and SiOx ($0<x<2$), wherein the magnetic field has a first line of magnetic force in a direction from the lower surface toward d ver surface of the anode current collector and the second line of magnetic force in a direct ion the upper so face toward the lower surface of the anode current collector that are periodically after lately formed, wherein the magnetic force strength of the first line magnetic force increases and ther decrease s to change o the second. of magnetic ford e, and the magnetic force strength of the second line of magnetic force increase and decreases, wherein a z-tensor value of the pore in the anode mixture layer, obtained by evaluating an orientation tensor in each axial direction, after three-dimensionally imaging the pores inside the anode mixture layer formed by applying a magnetic field thereto using an X-ray microscope, is 0.25 or more.

7. The method of claim 6, wherein, in step (B), the magnetic field in which a direction of a line of magnetic force and a magnetic force strength change is applied from both upper and lower surfaces of the anode current collector.

8. The method of claim 6, wherein, in the magnetic field, lines of magnetic force are perpendicular to upper and lower surfaces of the anode current collector.

9. The method of claim 7, wherein the line of magnetic force has a sine wave in the magnetic force strength and a direction of the line of magnetic force.

10. The method of claim 7, wherein the direction of the line of magnetic force changes at a cycle of 100 mm to 1000 mm of movement of the anode current collector with respect to the magnetic field.

11. The method of claim 6, wherein the magnetic field has a maximum magnetic force strength of 4000 Gauss or more.

12. The method of claim 6, wherein the magnetic field is applied for 1 second or more.

13. The method of claim 6, wherein the anode mixture slurry has a viscosity of 150,000 centipoise or less when measured at 25° C. and a shear rate of $0.1 s^{-1}$.

14. A secondary battery, comprising:

an electrode assembly in which anodes of claim 1 and cathodes including a cathode mixture layer on at least one surface of a cathode current collector are alternately stacked with separators as a boundary; and a battery case in which the electrode assembly is accommodated and sealed.

* * * * *